United States Patent
Rygaard

(10) Patent No.: US 7,065,783 B2
(45) Date of Patent: Jun. 20, 2006

(54) MOBILE APPLICATION ACCESS CONTROL LIST SECURITY SYSTEM

(75) Inventor: Christopher A. Rygaard, Sunnyvale, CA (US)

(73) Assignee: Aramira Corporation, Moffett Field, CA (US)

( * ) Notice: Subject to any disclaimer, the term of this patent is extended or adjusted under 35 U.S.C. 154(b) by 804 days.

(21) Appl. No.: 10/190,427

(22) Filed: Jul. 2, 2002

(65) Prior Publication Data

US 2003/0009675 A1    Jan. 9, 2003

Related U.S. Application Data

(60) Provisional application No. 60/303,446, filed on Jul. 6, 2001.

(51) Int. Cl.
H04L 9/00 (2006.01)
G06F 15/16 (2006.01)

(52) U.S. Cl. .............................. 726/4; 726/1; 709/229
(58) Field of Classification Search ..................... None
See application file for complete search history.

(56) References Cited

U.S. PATENT DOCUMENTS

| | | | |
|---|---|---|---|
| 5,633,932 A | 5/1997 | Davis et al. | |
| 5,787,427 A * | 7/1998 | Benantar et al. | ................ 707/9 |
| 5,850,516 A | 12/1998 | Schneier | |
| 5,850,517 A | 12/1998 | Verkler et al. | |
| 5,963,731 A | 10/1999 | Sagawa et al. | |
| 5,968,176 A | 10/1999 | Nessett et al. | |
| 5,974,549 A | 10/1999 | Golan | |
| 6,009,456 A | 12/1999 | Frew et al. | |
| 6,065,118 A | 5/2000 | Bull et al. | |
| 6,141,754 A | 10/2000 | Choy | |
| 6,148,327 A | 11/2000 | Whitebread et al. | |
| 6,173,405 B1 | 1/2001 | Nagel | |
| 6,189,103 B1 | 2/2001 | Nevarez et al. | |
| 6,192,354 B1 | 2/2001 | Bigus et al. | |
| 6,233,601 B1 | 5/2001 | Walsh | |
| 6,272,528 B1 | 8/2001 | Cullen et al. | |
| 6,308,181 B1 | 10/2001 | Jarvis | |
| 6,539,416 B1 | 3/2003 | Takewaki et al. | |
| 6,615,232 B1 | 9/2003 | Suzuki et al. | |
| 6,622,157 B1 | 9/2003 | Heddaya et al. | |
| 6,931,550 B1 * | 8/2005 | Rygaard | ..................... 709/223 |

FOREIGN PATENT DOCUMENTS

EP     0942370 A1    9/1999

OTHER PUBLICATIONS

Hamilton, "Sun Microsystems JavaBeans", Aug. 8, 1997, Sun Microsystems Inc., p. 1-114.*

(Continued)

*Primary Examiner*—Christopher Revak
(74) *Attorney, Agent, or Firm*—Fish & Richardson P.C.

(57) ABSTRACT

A mobile application security system and method, in the preferred embodiment, ensures the integrity of a mobile application's multi-jump access control list (ACL) by either (a) checking the compatibility of a mobile application's multi-jump ACL with a known accurate multi-jump ACL, or (b) overwriting a mobile application's multi-jump ACL with an ACL which is known to be accurate, depending on whether the host dispatching the mobile application is trusted or not trusted to modify a mobile application's multi-jump ACL, respectively.

28 Claims, 7 Drawing Sheets

OTHER PUBLICATIONS

W.A. Jansen, "A Privilege Management Scheme for Mobile Agent Systems" NIST May 2001.

Wayne Jansen, "Countermeasures for Mobile Agent Security", NIST Nov. 2000.

Wayne Jansen et al., "Privilege Management of Mobile Agents", NIST Oct. 2000.

W. Jansen, "Intrusion Detection with Mobile Agents" Computer Communications Journal, Special Issue On Intrusion Detection Oct. 2, 2001.

"Jumping Beans™ White Paper" Ad Astra Engineering, Incorporated Dec. 1998.

*Intrusion Detection with Mobile Agents*, Computer Communications Journal, Special Issue on Intrusion Detection, Jansen.

*Determining Privileges of Mobile Agents*, Proceedings of the Computer Security Applications Conference, Dec. 2001. Jansen.

*A Privilege Management Scheme for Mobile Agent Systems*, First International Workshop on Security of Mobile Multiagent Systems, Autonomous Agents Conference, May 2001. Jansen.

*A Denial of Service Resistant Intrusion Detection Architecture*, Computer Networks, Special Issue on Intrusion Detection, Elsevier Science BV, Nov. 2000. Mell et al.

*Countermeasures for Mobile Agent Security*, Computer Communications, Special Issue on Advanced Security Techniques for Network Protection, Elsevier Science BV, Nov. 2000. Jansen.

Privilege Management of Mobile Agents, National Information System Security Conference, Oct. 2000. Jansen et al.

*Mobile Agent Attack Resistant Distributed Hierarchical Intrusion Detection Systems*, Second International t Workshop on Recent Advances in Intrusion Detection, Sep. 1999, Purdue University. Mell et al.

*Applying Mobile Agents to Intrusion Detection and Response* NISTIR 6416, Sep. 1999. Jansen et al.

*Mobile Agent Security*, NIST Special Publication 800-19, Aug. 1999. Jansen et al.

*Agents for the Masses: Is it Possible To Make Development of Sophisticated Agents Simple Enough To Be Practical?*, IEEE Intelligent Systems, Special Issue on Agents, May-Jun., 1999. Bradshaw et al.

*Network Security Testing Using Mobile Agents* Third International Conference and Exhibition on the Practical Application of Intelligent and multi-Agent Technology. London, UK Mar. 1998. Karygiannis.

*A Framework For Multi-Mode Authentication: Overview and Implementation Guide*. NISTIR 7046 Aug. 2003. Jansen et al.

*Picture Password: A Visual Login Technique for Mobile Devices*. NISTIR 7030, Jul. 2003. Jansen et al.

*Security Policy Management for Handheld Devices*. The Int'l. Conference on Security and Management (SAM'03), Jun. 2003. Jansen et al.

*Authenticating Users on Handheld Devices*, Proceedings of the Canadian Information Technology Security Symposium, May 2003. Jansen.

*Policy Expression and Enforcement for Handheld Devices*, NISTIR 6981, May 2003. Jansen et al.

*Assigning and Enforcing Security Policies on Handheld Devices*, Proceedings of the Canadian Information Technology Security Symposium, May 2002. Jansen et al.

PCT International Search Report dated Jan. 2, 2003 corresponding to PCT US02/21186.

Office Action dated Dec. 18, 2003 for U.S. Appl. No. 09/764,548, filed Jan. 18, 2001.

Office Action dated Dec. 22, 2003 for U.S. Appl. No. 09/591,034, filed Jun. 9, 2000.

Office Action dated Dec. 31, 2003 for U.S. Appl. No. 09/758,941, filed Jan. 10, 2001.

Office Action dated Dec. 31, 2003 for U.S. Appl. No. 09/645,028, filed Aug. 23, 2000.

PCT International Search Report dated Jan. 2, 2003 corresponding to PCT US02/21186.

* cited by examiner

MOBILE APPLICATION ACCESS CONTROL LIST SECURITY SYSTEM

RELATED APPLICATION

This application claims priority under 35 USC 119 and 35 USC 120 to U.S. Provisional Patent Application Ser. No. 60/303,446 filed on Jul. 6, 2001 and entitled "Mobile Application Security System".

FIELD OF THE INVENTION

This invention relates generally to a mobile application security system and method and in particular to a mobile application privilege system and method that may be implemented for mobile applications that execute on various devices.

BACKGROUND OF THE INVENTION

In traditional computing systems, communication between computers is either code (a software application) or data (a file containing information) and there is no notion of a program moving between hosts while it is being executed. Thus, with a typical computing system, a person may execute a software application (e.g., Microsoft Word) on his own computer and then forward the results of the execution of the software application (e.g., a Word document) to another user. The other user may then view the Word document by executing his own copy of Microsoft Word. A user may also send another user an executable software application file that the other user may download and execute on his own computer. However, these traditional computing systems do not recognize a single instantiation of a software program that may be executed by one or more different computers in order to complete the execution of the software application.

A mobile application, sometimes also called a mobile app or a mobile agent, is a currently executing computer software application/program, or part of a currently executing computer program that can physically move from one computer to another (between hosts) while it is being executed: A mobile application's software may or may not have been previously installed on a particular computers prior to the arrival of the mobile application. The mobile applications are said to jump from one computer to another computer and the process of jumping from one computer to another computer is also referred to as a jump.

The process of initiating a jump between computers is commonly known as a dispatch. Typically, each mobile application will carry with it an ordered list or tree of hosts which the mobile application must visit during its execution, and such a list or tree is called the mobile application's itinerary. The computers that can receive and dispatch mobile applications are called hosts. The collection of hosts, computer networks, and software which executes and supports the mobile applications, and the mobile applications themselves, is called the mobile application system.

A mobile application typically has at least two parts: the state and the code. The state of the mobile application contains all of the data stored, carried, and/or computed by the particular mobile application. The code of the mobile application is the set of computer instructions which the host computer is intended to carry out on behalf of the mobile application during the execution of the mobile application by the particular host computer. In addition, a mobile application may have other parts, including an Access Control List (ACL), an itinerary, a datastore, an audit log, etc. A mobile application's software may or may not have been previously installed on the computers prior to the arrival of the mobile application.

Mobile applications have demonstrable benefits for computer systems. However, they also create security problems. In particular, a host computer might tamper with the code, the state, or the configuration of a mobile application before dispatching it to another host, in order to attack that host or another part of the mobile application system. Thus, there is a need to ensure that a host computer cannot adversely alter the configuration of a mobile application.

Current implementations of mobile application systems support multi-jump security. With this form of security, a mobile application has an Access Control List (ACL) which limits the mobile application's activities. This ACL is dynamically altered, based on the hosts which the mobile application has visited in the past. The ACL reflects the trust which should be placed in the mobile application, based on the hosts which it has visited in the past.

Current technology has limited provision to prevent a mobile application's ACL from being adversely altered. In particular, current implementations do not allow a mobile application's ACL to be altered to allow additional privileges for the mobile application, but it is possible for a host or a mobile application to restrict a mobile application's privileges by altering its ACL. A mobile application whose ACL has been altered to be too restrictive might be unable to complete its intended task. Thus, it is desirable to provide a system which prevents, where appropriate, a mobile application's ACL from becoming too restrictive.

SUMMARY OF THE INVENTION

The security system and method in accordance with the invention prevents a mobile application's ACL from becoming too restrictive. In particular, the security system checks a mobile application's ACL to ensure that it is not too restrictive. In more detail, the system may assign a characteristic to each computing device. For example, the system may assign an untrusted indication to computing devices that might attempt to adversely modify a mobile application's ACL, and a trusted indication to computing devices which are trusted to alter a mobile application only in acceptable ways. Using the above designations that may be assigned by various different entities (e.g., typically a trusted entity), the security system determines if an untrusted host has illegally altered a mobile application's ACL.

Thus, in accordance with the invention, a mobile application security system is provided wherein the mobile application security system may be a spoke and hub architecture or a peer-to-peer network. The mobile application security system comprises a management and security console computer that executes instructions for controlling the security of a mobile application and one or more host computers connected to the console computer wherein each host computer executes the mobile application that jumps between the hosts during execution. The security console further comprises means for monitoring the security of the mobile application as it jumps between a dispatching host and another host wherein information about the mobile application and the dispatching host is communicated to the console computer and means for determining if a mobile application's ACL has been altered on each dispatch of the mobile application. A method for mobile application security is also described. In addition, a peer-to-peer mobile application security system and method are also described.

Thus, in accordance with the invention, a mobile application security system is provided. The mobile application security system has one or more hosts between which a mobile application jumps during the execution of the mobile application wherein the one or more hosts comprising a current host and a next host and a management and security console which ensures the security of the execution of the mobile application wherein the mobile application is sent to the management and security console between the jump from the current host to the next host. The management and security console calculates the access control list of the mobile application based on the current host to determine a computed access control list, compares the computed access control list to the actual access control list of the mobile application, and adjusts the actual access control list of the mobile application based on the computed access control list and a trust level associated with the current host.

DETAILED DESCRIPTION OF A PREFERRED EMBODIMENT

The invention is particularly applicable to a mobile application authentication system for wireless computing devices (e.g., cell phones, wireless e-mail devices, wireless computer devices and the like) and it is in this context that the invention will be described. It will be appreciated, however, that the system and method in accordance with the invention has greater utility since it may be used for the authentication of any vulnerable computing device, for any mobile application and with any mobile application security system architecture. To better understand the invention, a typical mobile application and an example of its execution will be provided.

Figure 1:
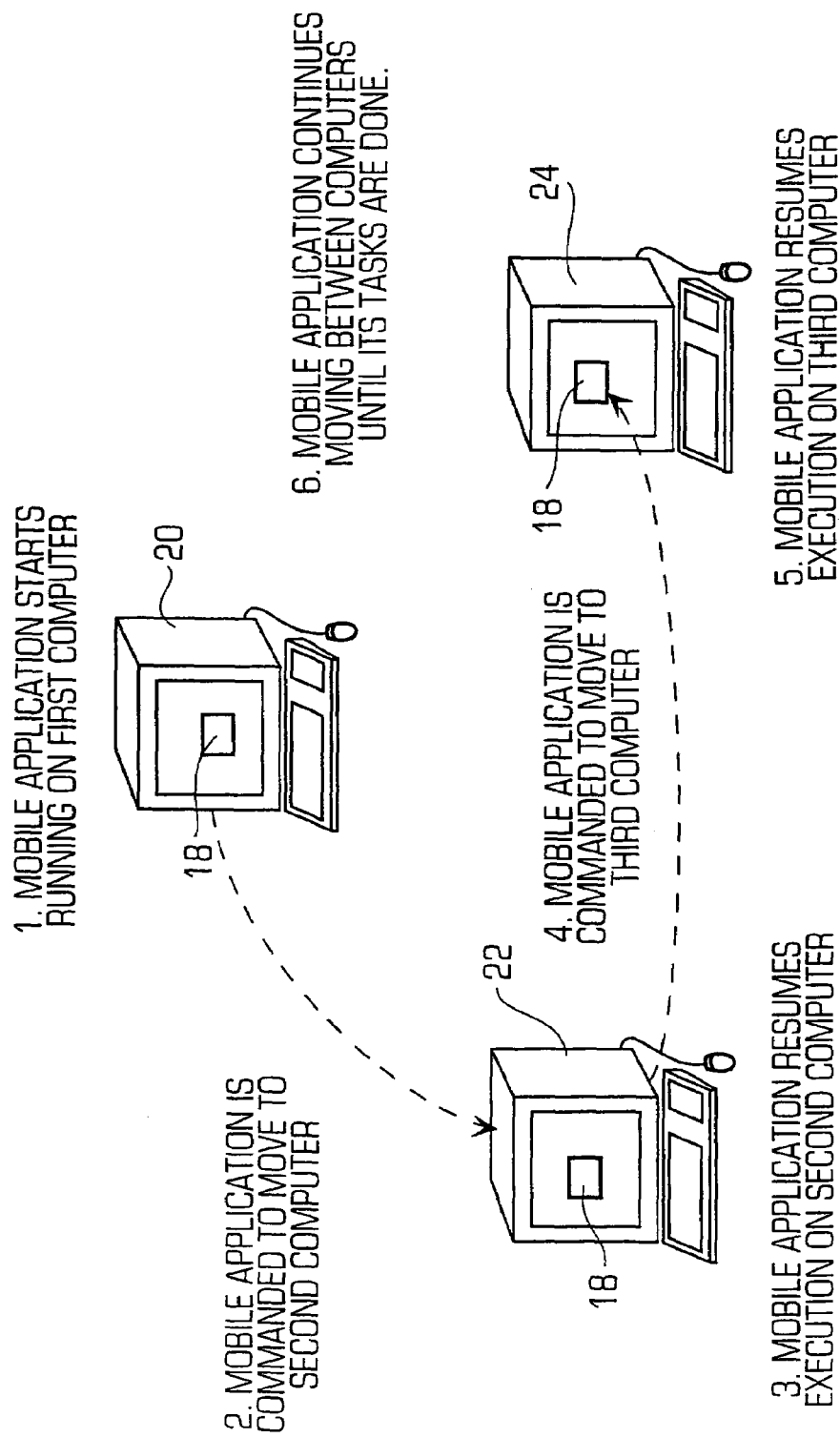
FIG. 1 illustrates a typical mobile application.

FIG. 1 illustrates a typical mobile application 18 and its operation. In particular, the mobile application 18 may start its execution on a first computer 20. At some point, the mobile application 18 is instructed to move to a second computer 22 and the mobile application jumps to the second computer as is well known. Once at the second computer, the mobile application resumes its execution on the second computer. At some later time, the mobile application is instructed to move to a third computer 24 and the mobile application jumps to the third computer and resumes its execution on the third computer. In this manner, the mobile application can execute on one or more different computers at different times as is well known for mobile applications.

To understand the concept of a mobile application, an example of a typical mobile application will now be provided.

Figure 2:
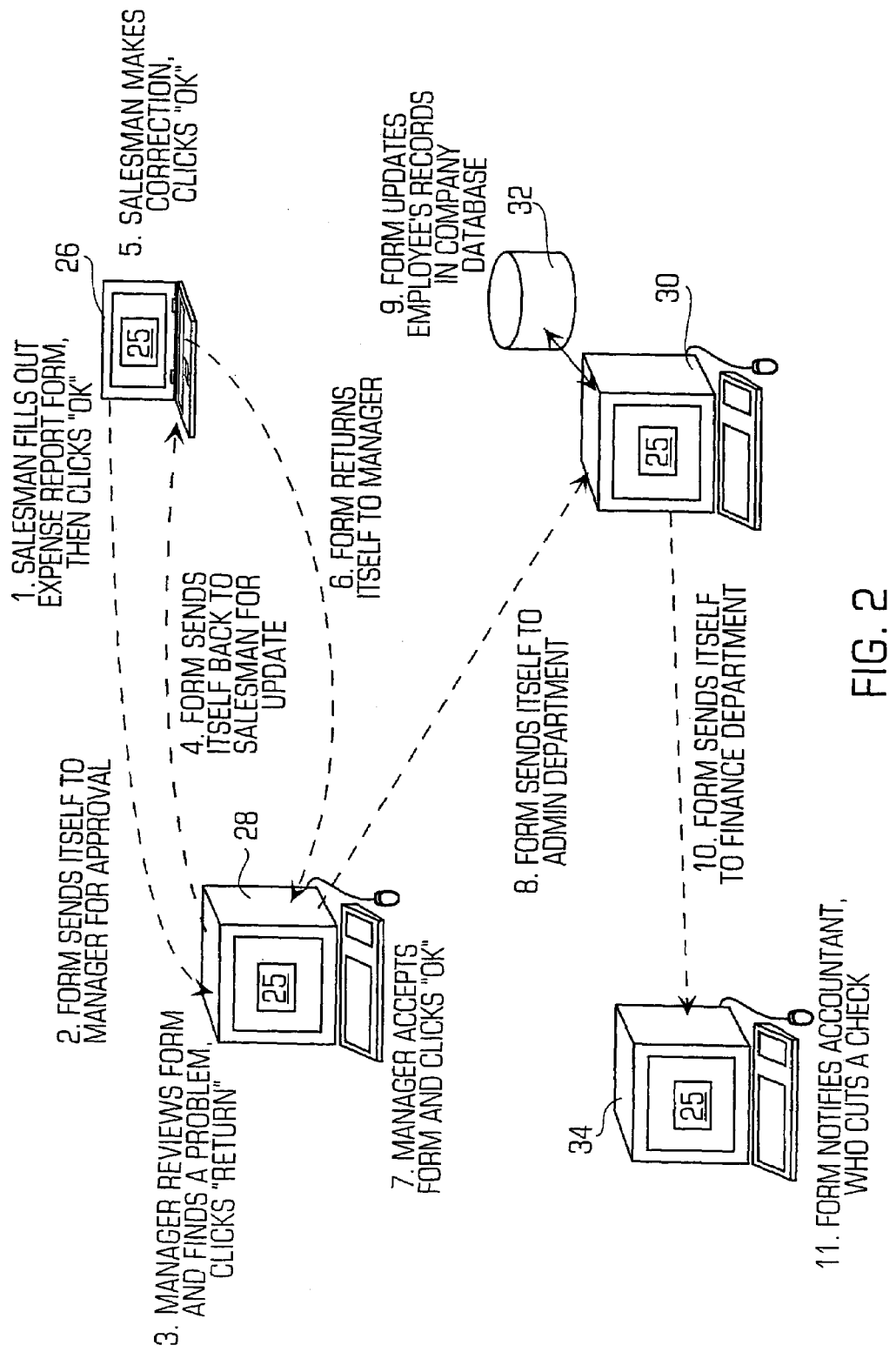
FIG. 2 illustrates an example of the execution of a typical mobile application.

FIG. 2 is a diagram illustrating an example of a typical mobile application 25 and in particular, an intelligent expense report form. In this example, the mobile application facilitates the expense report generation and processing by automatically performing some functions. In particular, a salesman at a laptop computer 26 may initially fill out an expense report form and click OK when the expense report is ready. Automatically, the mobile application 25 then sends itself to a manager's computer 28 for approval by the manager. In this example, the manager finds a problem with the form and returns it to the salesman so that the form automatically sends itself back to the salesman's computer 26 for an update. Next, the salesman makes the necessary corrections and clicks OK to send it automatically back to the manager's computer 28. With the further updates, the manager accepts the expense form and clicks "OK". The mobile expense report form then automatically sends itself to a computer 30 in the administration department. The mobile expense form then executes on the administration computer and updates a database 32 with the new information in the expense form. Next, the mobile expense report automatically sends itself to a computer 34 of the accountant. The mobile expense report then automatically starts to execute on the accountant's computer and notifies the accountant that a check is needed so that the accountant can cut the check for the salesman. Thus, the mobile application has automated much of the expense report submission process so that the people involved in the process do not have to worry about ensuring that the expense report is approved. This example of a mobile application is well known and understood by one of ordinary skill in the art. Now, a conventional mobile application security system will be described.

Figure 3:
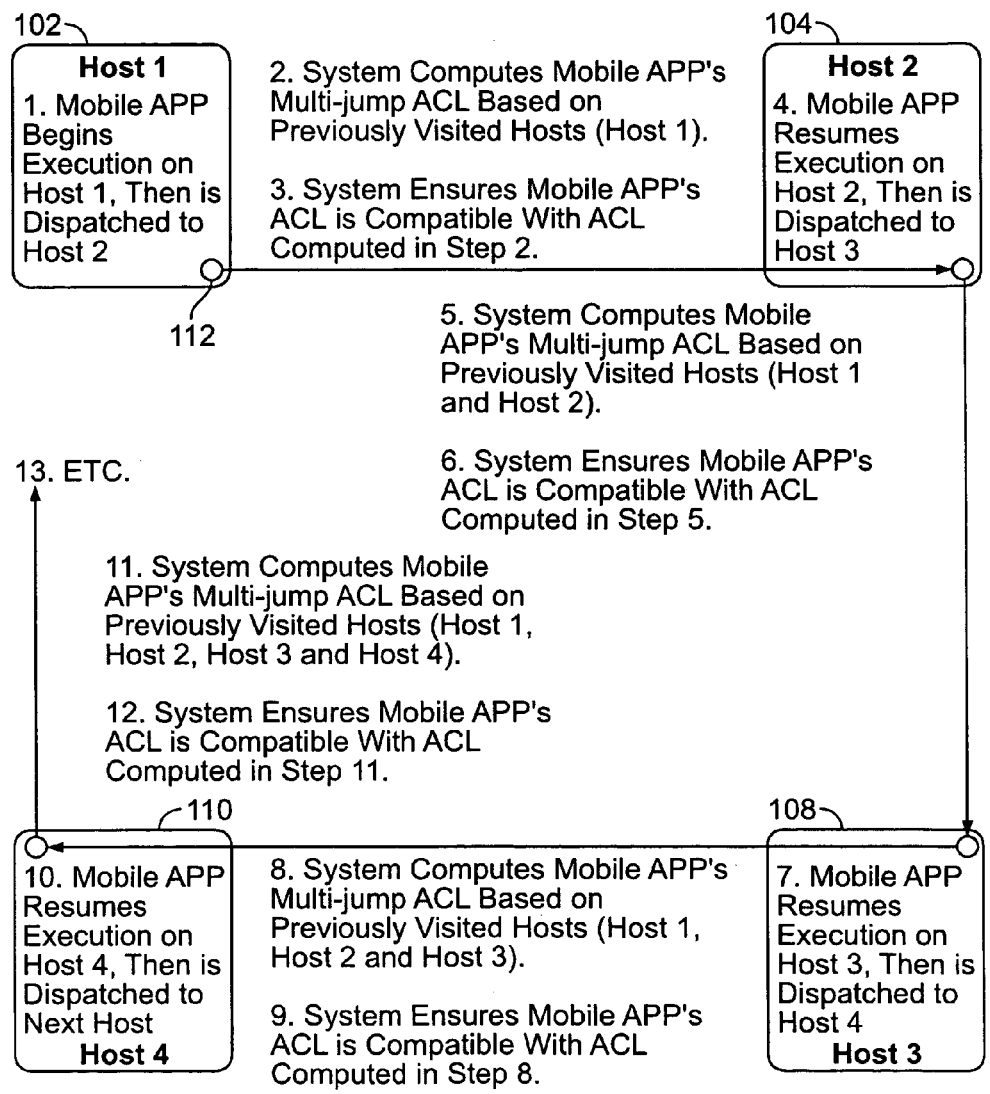
FIG. 3 is a diagram illustrating how current mobile application techniques handle a mobile application's ACL.

FIG. 3 illustrates a conventional technique for managing the multi-jump ACL of a mobile application. With earlier techniques, a host computer 102, Host 1, would instantiate a mobile application 112, and then later dispatch it to the second host 104, Host 2. The mobile application system would then simply ensure that the mobile application's multi-jump is compatible with a multi-jump ACL computed for the mobile application. Typically, the mobile application system would ensure that the mobile application's ACL is as restrictive as, or more restrictive than, the multi-jump ACL computed for the mobile application. After ensuring the mobile application's multi-jump ACL is compatible with the computed ACL for the mobile application, the mobile application system would then forward the mobile application to Host 2. This would be repeated on each jump made by the mobile application, with no differentiation between trusted and untrusted hosts. With previous mobile application techniques, a mobile application's multi-jump ACL could be modified by an attacking host such that its privileges are too restrictive to allow the mobile application to complete its intended task. Now, a mobile application security system in accordance with the invention that manages the ACL better and overcomes the limitations of the conventional system will be described.

Figure 4A:
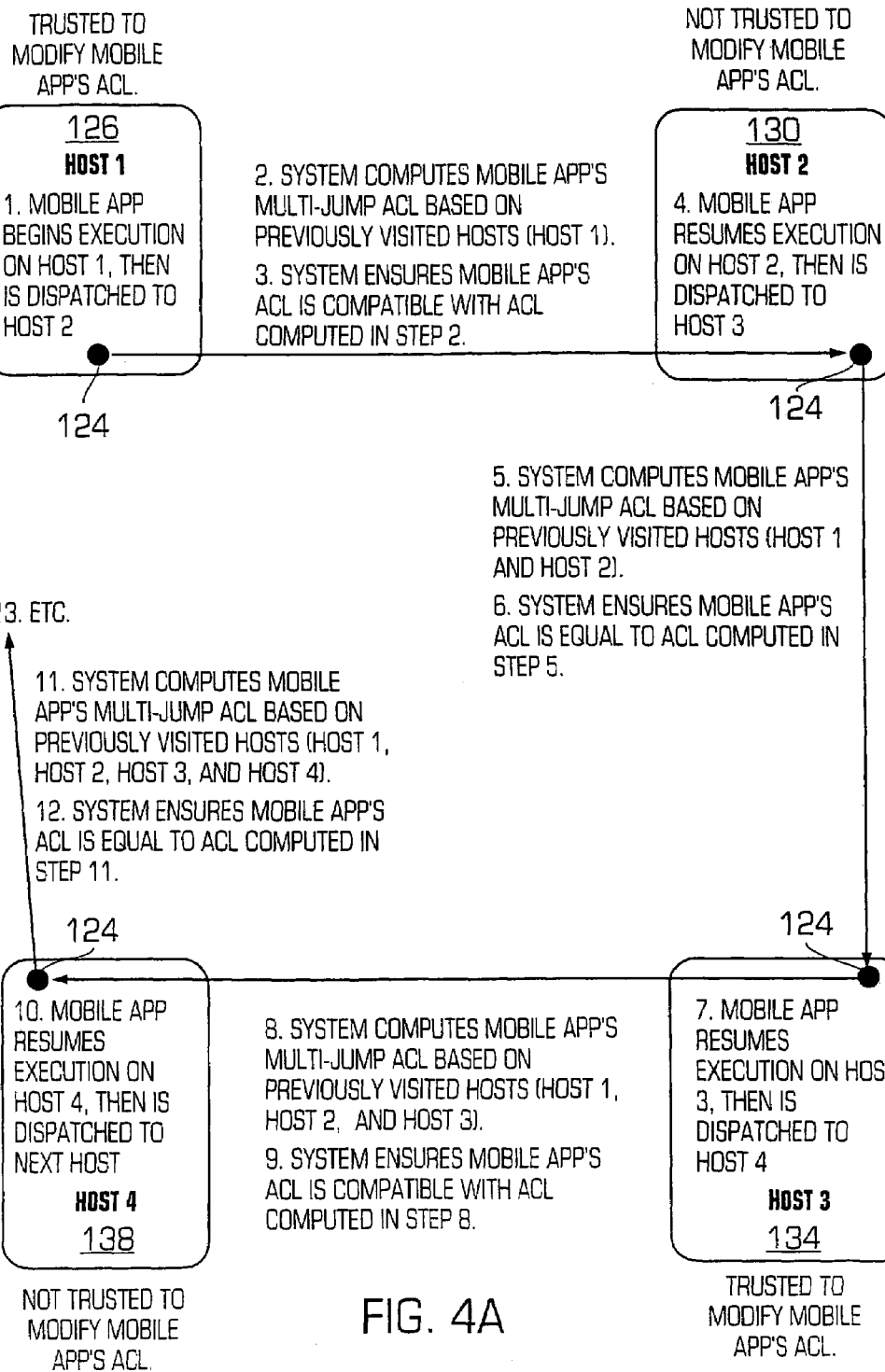
FIG. 4A is a diagram illustrating how the mobile application security system in accordance with the invention manages an access control list (ACL) of a mobile application.

FIG. 4A illustrates the mobile application security system in accordance with the invention that manages the ACL in accordance with the invention. In this invention, the mobile application system designates some hosts as "trusted to alter a mobile application's ACL", and designates the other hosts as "not trusted to alter a mobile application's ACL". A host that is trusted to alter the mobile application's ACL can alter the ACL and make it more restrictive than it previously was whereas a host that is not trusted to alter the mobile application's ACL cannot alter the ACL since it might alter it so that the mobile application cannot complete its intended task. Thus, the invention protects the mobile application from untrusted hosts who might tamper with the ACL and make it too restrictive and ensures that the mobile application is able to complete its task.

In this illustration, a mobile application 124 is instantiated on the first host 126, Host 1. Then the mobile application is dispatched to a second host 130, Host 2 as is well known for mobile applications. In this example, Host 1 is designated as "trusted to modify a mobile application's multi-jump ACL", so during the jump, the mobile application security system ensures that the mobile application's multi-jump ACL is compatible with a multi-jump ACL computed for the mobile application by the mobile application security system, but not necessarily equal to (identical to) it. Compatible means that the ACL of the mobile application is as restrictive as or more restrictive than the computed ACL wherein the ACL is described below in more detail. Then the mobile application system forwards the mobile application to Host 2 and the mobile application resumes execution on Host 2. Later the mobile application is dispatched to a third host 134, Host 3. In this example, Host 2 is designated as "not trusted to modify a mobile application's multi-jump ACL", so the mobile application security system ensures that the mobile application's multi-jump ACL is equal to the multi-jump ACL computed for the mobile application by the mobile application security system.

This process is repeated for each host visited by the mobile application. With each jump, the mobile application security system checks to see if the host, from which the mobile application was just dispatched, is designated as "trusted to modify a mobile application's multi-jump ACL". If so, the mobile application security system simply ensures that the mobile application's multi-jump ACL is compatible with a multi-jump ACL computed for the mobile application by the mobile application security system, but not necessarily equal to it. In other words, the ACL may be at least as or more restrictive than the computed ACL which is acceptable since the host is trusted to alter the ACL because the trusted host is trusted not to alter the ACL such that the mobile application cannot complete its task. If the host is designated as "not trusted to modify a mobile application's multi-jump ACL", the mobile application security system in accordance with the invention ensures that the mobile application's multi-jump ACL is equal to (a copy of the computed ACL in a preferred embodiment) a multi-jump ACL computed for the mobile application by the mobile application security system. In other words, since the host is not trusted, the ACL of the mobile application is overwritten with the computed ACL since the system cannot trust that the host will not alter the ACL to make the mobile application unable to operate. Thus, the system in accordance with the invention protects the mobile applications from nefarious hosts who might seek to change the ACL of the mobile application to disable the mobile application.

Thus, the mobile application security system in accordance with the invention is more restrictive with ACL alterations for untrusted hosts, but less restrictive with ACL alterations for trusted hosts. Therefore, the access control list (ACL) for a mobile application is only as restrictive as required by the hosts which are executing the mobile application. For example, a mobile application that is dispatched to only trusted hosts during its execution can have its ACL modified during the execution of the mobile application (so that the ACL is at least as restrictive as the computed ACL, but will not restrict the operation of the mobile application) so that there is less restrictions on modifications to the ACL. A mobile application that is executed/dispatched from at least one untrusted host requires that the ACL is identical to the computed ACL after the jump from the untrusted host so that the untrusted host cannot modify the ACL and attempt to prevent the mobile application from completing its task so that there are more restrictions on modification of the ACL. The mobile application security system in accordance with the invention therefore adjusts the level of restriction for modification of the ACL for a mobile application according to the hosts which are dispatching the mobile application. The further steps shown in FIG. 4 are described in more detail below with reference to FIG. 6.

Figure 4B:
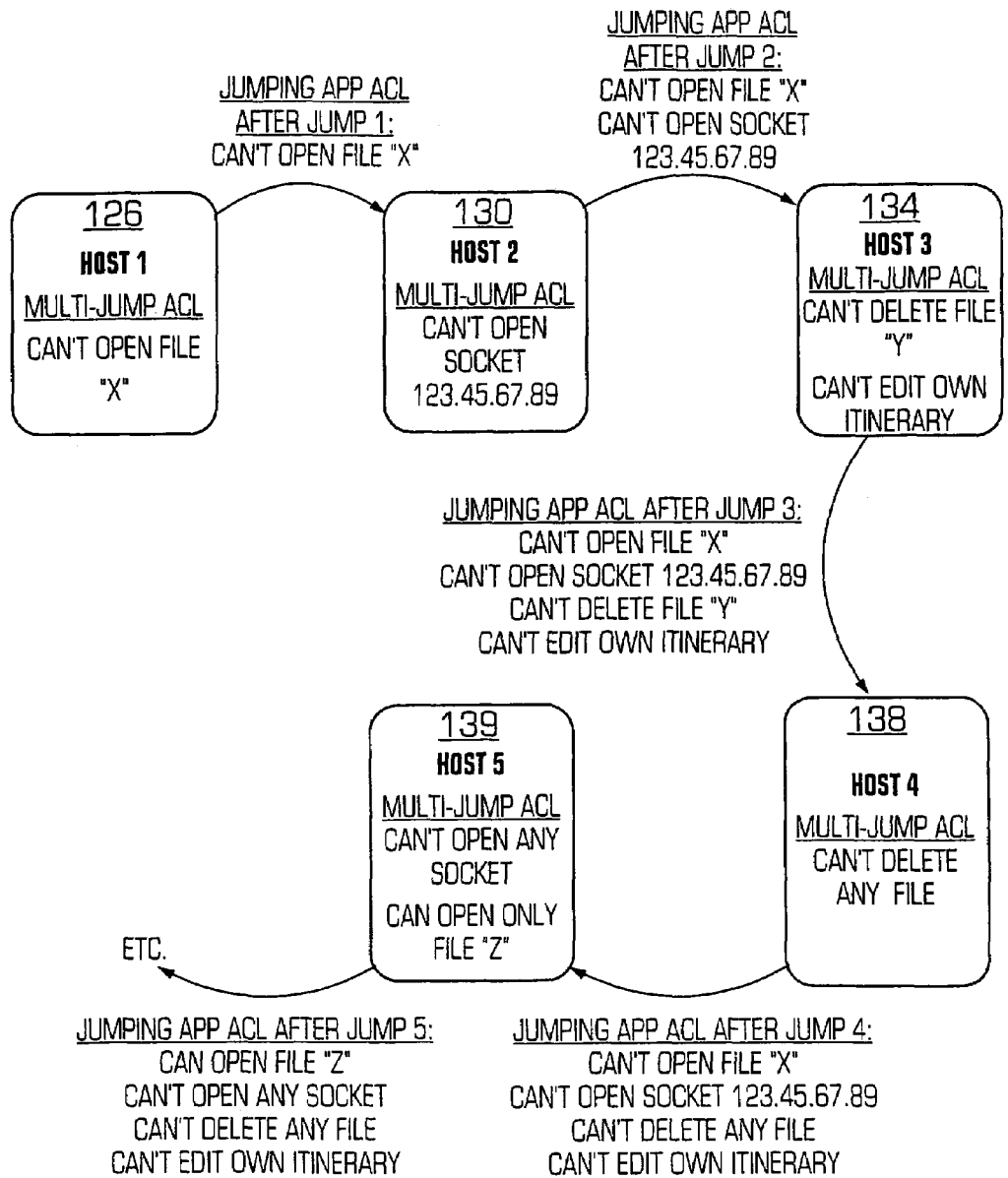
FIG. 4B is a diagram illustrating the access control list of a mobile application.

FIG. 4B illustrates an example of a computed access control list for a mobile application as it is being executed. As shown, the access control list (ACL) when it is executed by Host 1 126 is "Can't open file "x"" which means that the mobile application is restricted in that it cannot open that file. At Host 2 130, the mobile application's ACL is modified to include "Can't open socket 123.45.67.89" so that the ACL after Host 2 (which would be calculated by the MaSC) is 1) "Can't open file "x""; and 2) "Can't open socket 123.45.67.89". As shown, the ACL can then be modified at each future jump to another host such that the ACL after Host 5 139 is as shown in FIG. 4B. Thus, as the mobile application is being executed, it has its ACL modified. In some cases, the host may further modify an existing restriction such as changing "can't open socket XXX" to "can't open any socket" so that the ACL becomes more restrictive. Now, the preferred architecture of the mobile application security system will be described.

Figure 5:
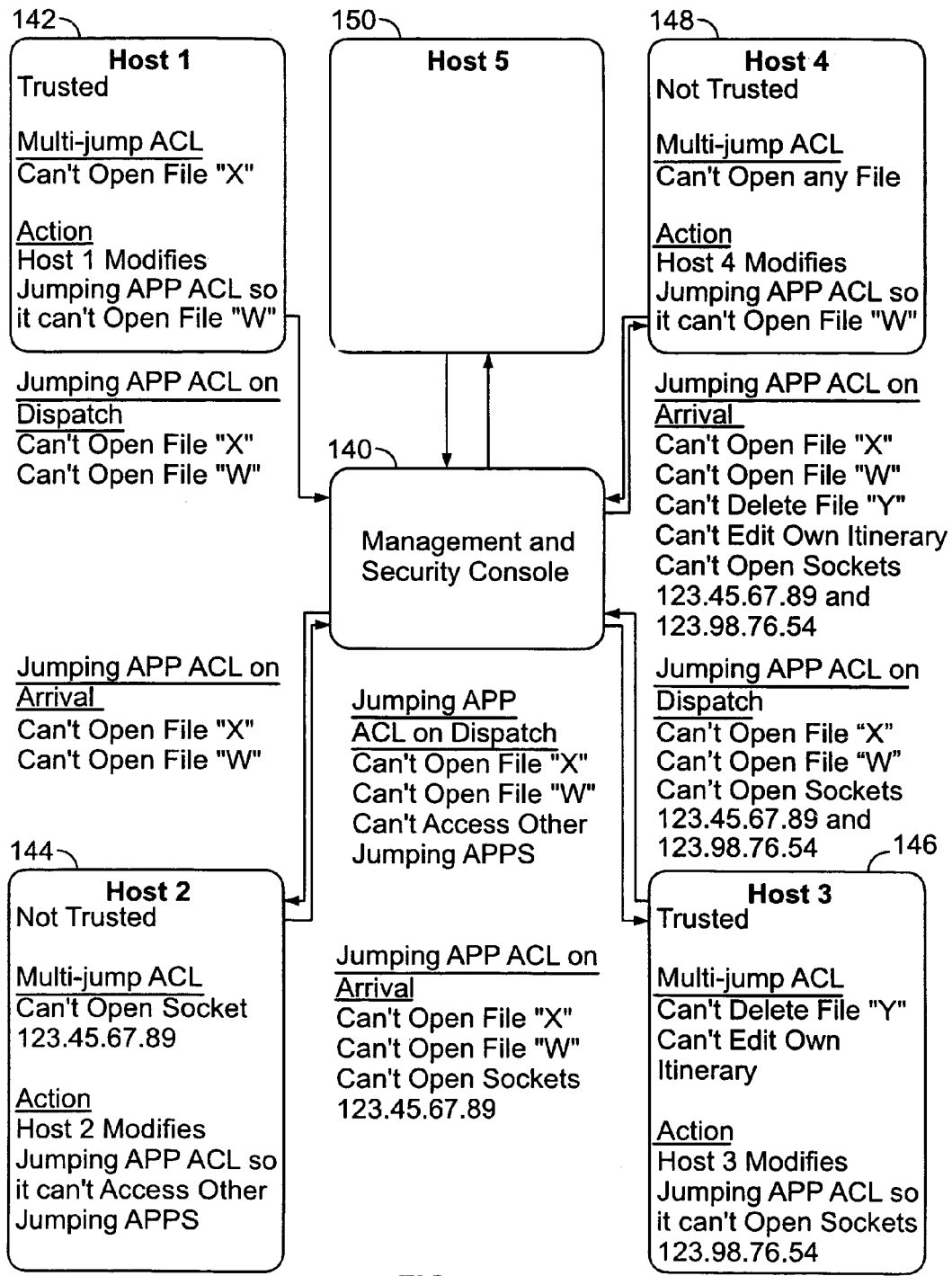
FIG. 5 is a diagram illustrating the architecture of the preferred embodiment of the mobile application security system in accordance with the invention.

FIG. 5 illustrates an architecture of a preferred embodiment of a mobile application security system 100 in accordance with the invention. In this architecture, there is a Management and Security Console 140 (MaSC) which forms the hub of a spoke-and-hub arrangement. In this preferred embodiment, the MaSC comprises one or more pieces of software code being executed by a computing device, such as a server, which receive the mobile application, manage the ACL of the mobile application (e.g., compute the ACL of the mobile application based on the prior hosts, compare the actual ACL of the mobile application with the computed ACL and adjust the ACL of the mobile application accordingly as described below in more detail) and dispatches the mobile application to the next host assuming that the management process does not generate an error. The code for the MaSC may be, for example, implemented as Java code or using various other well-known programming languages. In this arrangement, one or more hosts 142, 144, 146, 148, and 150 (five hosts are shown in FIG. 5, but the mobile application security system in accordance with the invention may be used with a plurality of hosts) never communicate/send the mobile application directly to each other. Instead, the hosts 142–150 communicate only with the MaSC 140 and send the mobile application to the MaSC for each jump. This in turn implies that on each jump, each mobile application 141 must pass through the MaSC 140 so that the MaSC performs its ACL management process at each jump. When the MaSC 140 computes the ACL of the mobile application, the MaSC 140 merges the multi-jump ACLs of all of the previously visited hosts. The merging process is a most-restrictive composite wherein most restrictive means that any privilege not allowed by one or more previously visited hosts (such as "can't open any socket") is not allowed in the composite.

In the preferred embodiment of the invention, a trusted party or system administrator has access to the MaSC 140 and this trusted party designates each host as either "trusted to modify a mobile application's ACL" or "not trusted to modify a mobile application's ACL" as described below in more detail. This architecture of the mobile application security system in the preferred embodiment allows the MaSC 140 to track the progress of each mobile application, so that the MaSC 140 knows all of the previous hosts visited by each mobile application. This knowledge of the itinerary of the mobile application in turn allows the MaSC 140 to compute a mobile application's multi-jump ACL based on the previously visited hosts which in turn permits the MaSC 140 to perform its ACL management for each jump of the mobile application.

The most effective technique to securely implement this invention is as part of a spoke-and-hub arrangement as shown in FIG. 5 and described above. With this architecture, the management and security console will check the multi-jump ACL of each mobile application during each jump. To accomplish this, each participating host is registered by some mechanism with the management and security console and the management and security console contains information about which hosts are trusted to modify a mobile application's multi-jump ACL, and which hosts are not trusted to modify a mobile application's multi-jump ACL. Typically, such information is entered by the system administrator through the management and security console. For example, the system administrator may determine the trustworthiness of the host based on what the system administrator knows, or believes, about 1) the user at the host computer; and 2) the vulnerability to attack of the host computer. On each jump, each mobile application's multi-jump ACL is checked by the management and security console. The mobile application system may also be implemented as a peer-to-peer system wherein the management and security console is connected to each host. In addition, the mobile application system may also be implemented as a peer-to-peer system without any centralized computer, wherein the hosts collaboratively perform the appropriate checks. For the peer-to-peer embodiment with the MaSC connected to each host, the MaSC may be one or more pieces of software code resident on a computing device which perform the ACL management process. For the peer-to-peer embodiment without a centralized computer, the MaSC may be implemented as one or more pieces of software code resident on each host which collectively perform the ACL management process.

As shown in FIG. 5, the ACL of the mobile application on dispatch from the current host and the ACL of the mobile application on arrival at the next host (after passing through the MaSC is shown to illustrate how the ACL is management in accordance with the invention. For example, the mobile application which arrived at Host 1 142 has an ACL which includes "can't open file X" and Host 1 142 adds the restriction "can't open file W". The MaSC 140 then receives the ACL of the mobile application which contains the two restrictions shown. The MaSC computes the ACL of the mobile application to be the same as the ACL of the mobile application. Since Host 1 is trusted by the MaSC 140, the actual ACL of the mobile application is accepted by the MaSC (since it is compatible with and at least as restrictive as the computed ACL) and then mobile application is dispatched to Host 2 144. At Host 2, the mobile application has the restriction "can't open socket 123.45.67.89" as shown. Host 2 then attempts to modify the ACL to include the restriction "can't access other mobile applications (jumping applications)". The mobile application is then sent to the MaSC which computes the ACL to include "can't open file w", "can't open file x" and "can't open socket 123.45.67.89". Since Host 2 is not trusted, the ACL of the mobile application is more restrictive than the computed ACL and the computed ACL overwrites the ACL of the mobile application so that the mobile application that arrives at Host 3 146 has the computed ACL. This ensures that Host 2, which is not trusted, did not modify the ACL is some manner to prevent the mobile application from completing its task. Since Host 3 146 is trusted, it further modifies the ACL as shown. In this manner, the host which can and cannot modify the ACL are managed to ensure that the mobile application completes its task. Now, the access control list management process in accordance with the invention will be described in more detail.

Figure 6:
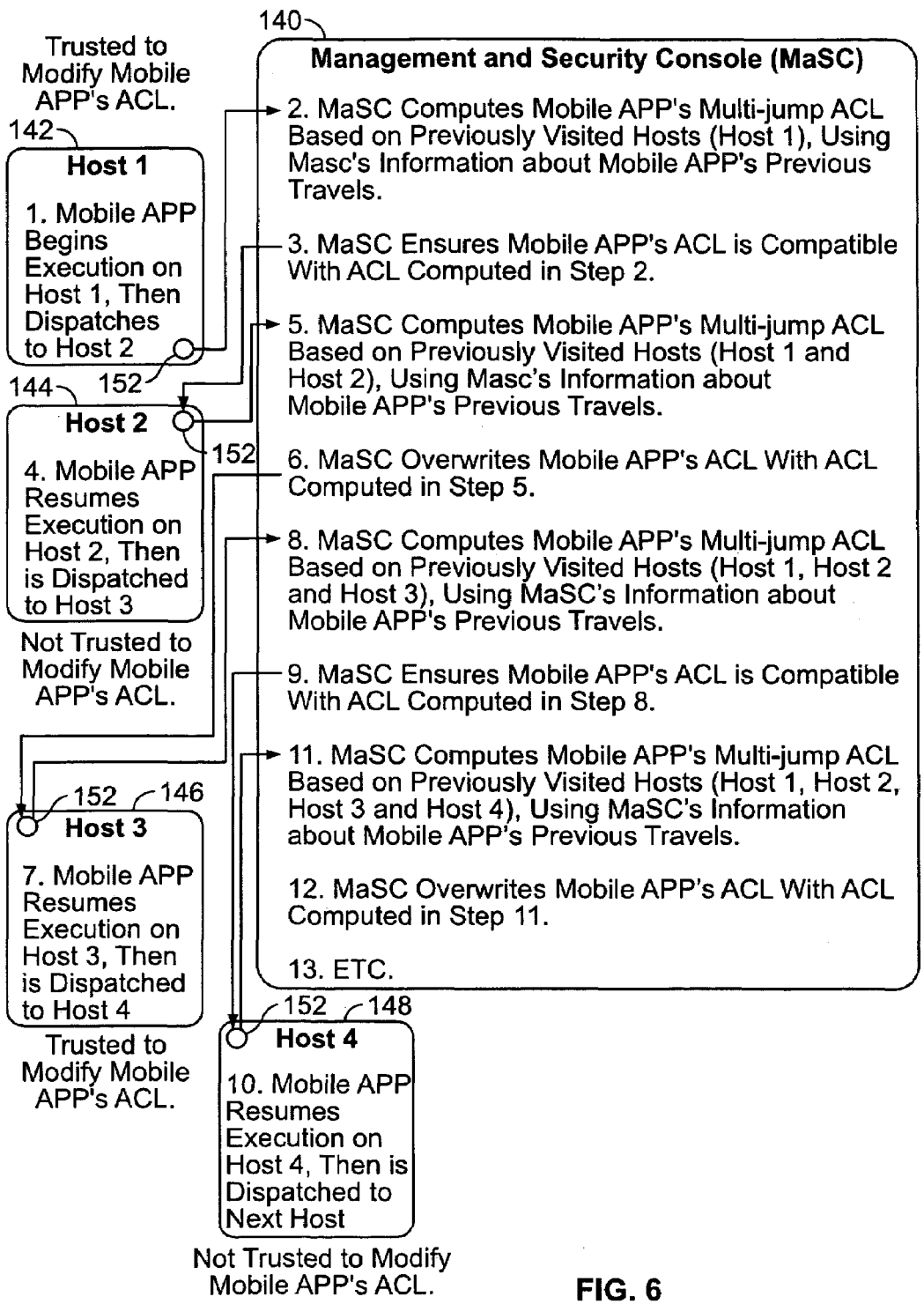
FIG. 6 is a diagram illustrating the details of the preferred embodiment of the management of the access control list (ACL) of a mobile application by the mobile application security system in accordance with the invention.

FIG. 6 illustrates the details of a preferred access control list (ACL) management process in accordance with the invention using the preferred architecture of the mobile application security system as shown in FIG. 5. In this example, a mobile application 152 is instantiated on Host 1 142, executed to Host 1 and then later dispatches to Host 2 144, Host 3 146, and Host 4 148, in order. In this example, Host 1 142 is designated as "trusted to modify a mobile application's ACL", Host 2 144 is designated as "not trusted to modify a mobile application's ACL", 3 146 is designated as "trusted to modify a mobile application's ACL", and Host 4 148 is designated as "not trusted to modify a mobile application's ACL" as determined by the MaSC 140 as described above.

In accordance with the preferred embodiment, the following steps may occur as the mobile application is being executed by the one or more hosts:

1. The mobile application 152 is instantiated on Host 1 142, executed by Host 1 and is later dispatched to Host 2.

2. The mobile application 152 is passed to the MaSC 140. The MaSC 140 knows that the mobile application 152 has visited only Host 1 142, so it computes a multi-jump ACL based on Host 1 142 alone.

3. Because the MaSC 140 knows that Host 1 142 is designated as "trusted to modify a mobile application's ACL", the MaSC 140 ensures that the mobile application's ACL is compatible with the ACL computed in Step 2, and does not ensure that the mobile application's ACL is equal to the mobile application's computed ACL.

4. Assuming Step 3 finishes and the mobile application's ACL is compatible with the computed ACL (since the mobile application would be stopped if the ACL was not compatible), the MaSC 140 forwards the mobile application 152 to Host 2 144 according to the itinerary of the mobile application. The mobile application 152 resumes execution on Host 2 144, and is later dispatched to Host 3 146.

5. The mobile application 152 is passed to the MaSC 140. The MaSC 140 knows that the mobile application 152 has visited Host 1 142 and Host 2 144, so it computes a multi-jump ACL for the mobile application 152 based on Host 1 142 and Host 2 144.

6. Because the MaSC 140 knows that Host 2 144 is designated as "not trusted to modify a mobile application's ACL", the MaSC ignores the multi-jump ACL of the mobile application 152, and simply overwrites the multi-jump ACL of the mobile application 152 with the multi-jump ACL computed in Step 5 so that the ACL of the mobile application is equal to (and therefore more restrictive) to the computed ACL.

7. The MaSC 140 then forwards the mobile application 152 with the new ACL to Host 3 146. The mobile application 152 resumes execution on Host 3 146, and is later dispatched to Host 4 148.

8. The mobile application 152 is passed to the MaSC 140. The MaSC 140 knows that the mobile application 152 has visited Host 1 142, Host 2 144, and Host 3 146, so it computes a multi-jump ACL for the mobile application 152 based on Host 1 142, Host 2 144 and Host 3 146.

9. Because the MaSC 140 knows that Host 3 146 is designated as "trusted to modify a mobile application's ACL", the MaSC 140 ensures that the mobile application's ACL is compatible with the ACL computed in Step 8, and does not ensure that the mobile application's ACL is equal to the mobile application's ACL.

10. Assuming Step 9 finishes and the ACL is compatible, the MaSC 140 forwards the mobile application 152 to Host 4 148. The mobile application 152 resumes execution on Host 2 148, and is later dispatched to the next host.

11. The mobile application 152 is passed to the MaSC 140. The MaSC 140 knows that the mobile application 152 has visited Host 1 142, Host 2 144, Host 3 146, and Host 4 148, so it computes a multijump ACL for the mobile application 152 based on Host 1 142, Host 2 144, Host 3 146 and Host 4 148.

12. Because the MaSC 140 knows that Host 4 148 is designated as "not trusted to modify a mobile application's ACL", the MaSC ignores the multi-jump ACL of the mobile application 152, and simply overwrites the multi-jump ACL of the mobile application 152 with the multi-jump ACL computed in Step 11 so that the ACL of the mobile application is more restricted.

13. The MaSC 140 then forwards the mobile application to the next host, and the process continues.

This arrangement of the preferred embodiment allows the MaSC to check each mobile application's ACL on each jump. If the mobile application is jumping from a host which is designated as "trusted to alter a mobile application's ACL", then the MaSC will simply check the mobile application's ACL to determine if its ACL is compatible with the ACL computed by the MaSC based on previously visited hosts since trusted hosts may modify the ACL. If not, the MaSC will reject the mobile application, thereby preventing it from jumping to the next host. If the mobile application is jumping from a host which is designated as "not trusted to alter a mobile application's ACL", then the MaSC 140 will simply overwrite the mobile application's ACL with an ACL computed by the MaSC 140 based on the hosts previously visited by the mobile application to prevent altering of the ACL of the mobile application.

It will be appreciated that a mobile application system which implicitly assumes that all hosts are not trusted to modify a mobile application's multi-jump ACL by ensuring on each jump that the mobile application's multi-jump ACL is equal a multi-jump ACL computed by the mobile application security system, without any explicit notion of whether the host is trusted to do so, is a subset of the invention described herein.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A mobile application security system, comprising:
one or more hosts between which a mobile application jumps during the execution of the mobile application, the one or more hosts comprising a current host and a next host; and
a management and security console which ensures the security of the execution of the mobile application wherein the mobile application is sent to the management and security console between the jump from the current host to the next host, the management and security console further comprising means for calculating the access control list of the mobile application based on the current host to determine a computed access control list; means for comparing the computed access control list to the actual access control list of the mobile application and means for adjusting the actual access control list of the mobile application based on the computed access control list and a trust level associated with the current host.

2. The mobile application security system of claim 1, wherein the management and security console further comprises means for assigning a trust level to each host in the mobile application system indicating whether or not the host is able to modify the access control list of the mobile application.

3. The system of claim 2, wherein the mobile application jumps is programmed to jump to a third host and wherein the computed access control list comprises the access control list based on the first and next hosts.

4. The system of claim 3, wherein the mobile application jumps to a plurality of hosts during its execution and wherein the access control list for the mobile application prior to any jump comprises an access control list computed based on all prior hosts to which the mobile application has jumped during its execution.

5. The system of claim 2, wherein the adjusting means further comprises means, if the current host is trusted to modify the access control list, for leaving the access control list unaltered if the actual access control list of the mobile application is as restrictive as or more restrictive than the computed access control list.

6. The system of claim 5, wherein the adjusting means further comprises means, if the current host is not trusted to modify the access control list, for overwriting the access control list of the mobile application if the actual access control list of the mobile application is different than the computed access control list.

7. A mobile application security method executed for a mobile application which jumps between at least a current host and a next host during its execution, the method comprising:
providing a management and security console which ensures the security of the execution of the mobile application wherein the mobile application is sent to the management and security console between the jump from the current host to the next host;
calculating the access control list of the mobile application based on the current host to determine a computed access control list;
comparing the computed access control list to the actual access control list of the mobile application; and
adjusting the actual access control list of the mobile application based on the computed access control list and a trust level associated with the current host.

8. The mobile application security method of claim 7 further comprising assigning a trust level to each host in the mobile application system indicating whether or not the host is able to modify the access control list of the mobile application.

9. The method of claim 8, wherein the mobile application jumps is programmed to jump to a third host and wherein the computed access control list comprises the access control list based on the first and next hosts.

10. The method of claim 9, wherein the mobile application jumps to a plurality of hosts during its execution and wherein the access control list for the mobile application prior to any jump comprises an access control list computed based on all prior hosts to which the mobile application has jumped during its execution.

11. The method of claim 8, wherein the adjusting further comprises, not altering, if the current host is trusted to modify the access control list, the access control list if the actual access control list of the mobile application is as restrictive as or more restrictive than the computed access control list.

12. The method of claim 11, wherein the adjusting further comprises overwriting, if the current host is not trusted to modify the access control list, the access control list of the mobile application if the actual access control list of the mobile application is different than the computed access control list.

13. A mobile application security system, comprising:
one or more hosts between which a mobile application jumps during the execution of the mobile application, the one or more hosts comprising a current host and a next host;
a management and security console which ensures the security of the execution of the mobile application wherein the mobile application is sent to the management and security console between the jump from the current host to the next host, the management and security console being connected to each host to form a hub and spoke arrangement; and
the management and security console further comprising means for calculating the access control list of the mobile application based on the current host to determine a computed access control list; means for comparing the computed access control list to the actual access control list of the mobile application and means for adjusting the actual access control list of the mobile application based on the computed access control list and a trust level associated with the current host.

14. The mobile application security system of claim 13, wherein the management and security console further comprises means for assigning a trust level to each host in the mobile application system indicating whether or not the host is able to modify the access control list of the mobile application.

15. The system of claim 14, wherein the mobile application jumps is programmed to jump to a third host and wherein the computed access control list comprises the access control list based on the first and next hosts.

16. The system of claim 15, wherein the mobile application jumps to a plurality of hosts during its execution and wherein the access control list for the mobile application prior to any jump comprises an access control list computed based on all prior hosts to which the mobile application has jumped during its execution.

17. The system of claim 14, wherein the adjusting means further comprises means, if the current host is trusted to modify the access control list, for leaving the access control list unaltered if the actual access control list of the mobile application is as restrictive as or more restrictive than the computed access control list.

18. The system of claim 17, wherein the adjusting means further comprises means, if the current host is not trusted to modify the access control list, for overwriting the access control list of the mobile application if the actual access control list of the mobile application is different than the computed access control list.

19. A method for managing the access control list of a mobile application which jumps between a current host and a next host during the execution of the mobile application, the method comprising:
calculating the access control list of the mobile application based on the current host to determine a computed access control list;
comparing the computed access control list to the actual access control list of the mobile application; and
adjusting the actual access control list of the mobile application based on the computed access control list and a trust level associated with the current host.

20. The mobile application security method of claim 19 further comprising assigning a trust level to each host in the mobile application system indicating whether or not the host is able to modify the access control list of the mobile application.

21. The method of claim 20, wherein the mobile application jumps is programmed to jump to a third host and wherein the computed access control list comprises the access control list based on the first and next hosts.

22. The method of claim 21, wherein the mobile application jumps to a plurality of hosts during its execution and wherein the access control list for the mobile application prior to any jump comprises an access control list computed based on all prior hosts to which the mobile application has jumped during its execution.

23. The method of claim 20, wherein the adjusting further comprises unaltering, if the current host is trusted to modify the access control list, the access control list if the actual access control list of the mobile application is as restrictive as or more restrictive than the computed access control list.

24. The method of claim 23, wherein the adjusting further comprises overwriting, if the current host is not trusted to modify the access control list, the access control list of the mobile application if the actual access control list of the mobile application is different than the computed access control list.

25. A mobile application management and security console for a mobile application system having one or more hosts between which a mobile application jumps during the execution of the mobile application, the one or more hosts comprising a current host and a next host wherein the mobile application is sent to the management and security console between the jump from the current host to the next host, the mobile application management and security console comprising:
means for calculating the access control list of the mobile application based on the current host to determine a computed access control list;
means for comparing the computed access control list to the actual access control list of the mobile application; and
means for adjusting the actual access control list of the mobile application based on the computed access control list and a trust level associated with the current host.

26. The console of claim 25 further comprising means for assigning a trust level to each host in the mobile application system indicating whether or not the host is able to modify the access control list of the mobile application.

27. The console of claim 26, wherein the adjusting means further comprises means, if the current host is trusted to modify the access control list, for leaving the access control list unaltered if the actual access control list of the mobile application is as restrictive as or more restrictive than the computed access control list.

28. The console of claim 26, wherein the adjusting means further comprises means, if the current host is not trusted to modify the access control list, for overwriting the access control list of the mobile application if the actual access control list of the mobile application is different than the computed access control list.

* * * * *